Dec. 5, 1967   J. P. GUTH   3,356,260
WASHER FEED DIALS FOR AUTOMATIC ASSEMBLY MACHINES
Filed July 5, 1966   2 Sheets-Sheet 1

INVENTOR
JACOB P. GUTH
Atty.

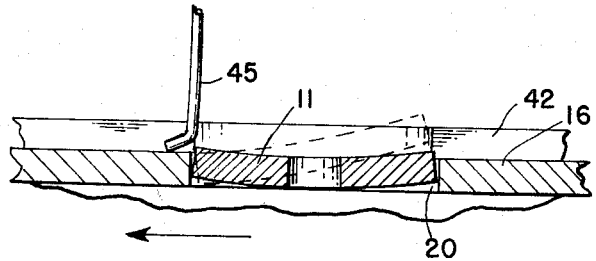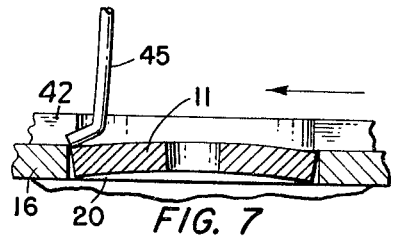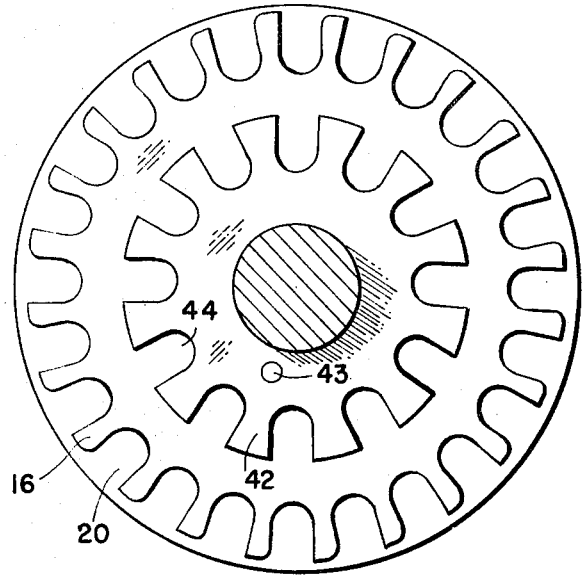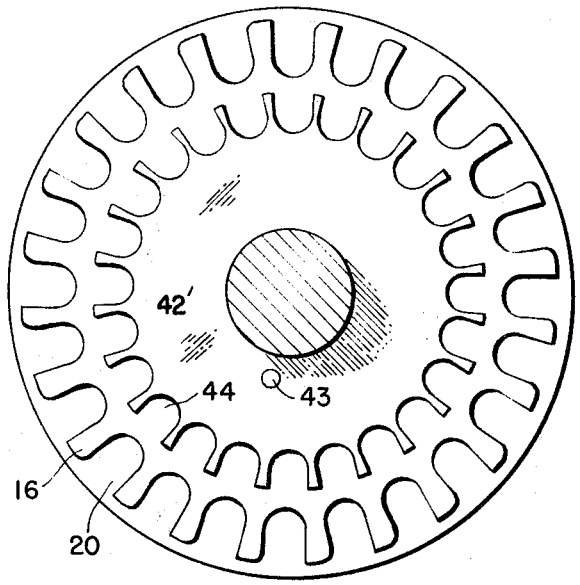

United States Patent Office 3,356,260
Patented Dec. 5, 1967

3,356,260
WASHER FEED DIALS FOR AUTOMATIC
ASSEMBLY MACHINES
Jacob P. Guth, Box 94, Davis Junction, Ill. 61020
Filed July 5, 1966, Ser. No. 562,845
5 Claims. (Cl. 221—167)

ABSTRACT OF THE DISCLOSURE

A smaller radius washer feed dial is superimposed on and turns with a main feed dial in concentric relation thereto, both dials having, opening into the peripheries thereof, radial notches for reception of washers in radially aligned relationship, either in the ratio of one to two or one to one, with a view to substantially increasing the machine's output in a direct ratio to the extent that this new arrangement of radially aligned notches insures the presence of a washer in practically every notch in the main dial, most of the vacancies being filled by gravity transfer of washers from the radially aligned notches in the secondary dial.

---

This invention relates to washer feed dials for use on assembling and roll-threading machines, like the Waterbury and Hartford types, for assembling screws and washers, the invention being particularly concerned with greatly increasing the output of such machines by insuring better feeding of washers to the assembly point where they receive the screw blanks prior to the roll-threading operation, the old feed means having left too many stations on the single dial vacant, thereby reducing production.

Belleville washers and crown washers have presented a problem in the feeding of washers in these machines from the standpoint that it is important to eject washers from the recesses in the washer feed dial when entered therein in inverted position and, if the ejecting means is efficient, there is a serious drop in production by reason of too many empty stations arriving at the assembly point. It is therefore the principal object of my invention to provide a smaller radius, secondary or auxiliary washer feed dial, superimposed on and turning with the main dial in concentric relation thereto and having radial notches for reception of washers in the periphery thereof aligned radially with similar notches in the periphery of the main dial, either in the ratio of one to one, or one to two, with a view to substantially increasing the machine's output in a direct ratio to the extent to which this arrangement insures the presence of a washer in practically every notch in the main dial, most all of the vacancies being filled by gravity feeding of washers from the radially aligned notches in the secondary dial.

The invention is illustrated in the accompanying drawings, in which—

Figures 1, 2, 3, 4, 5:
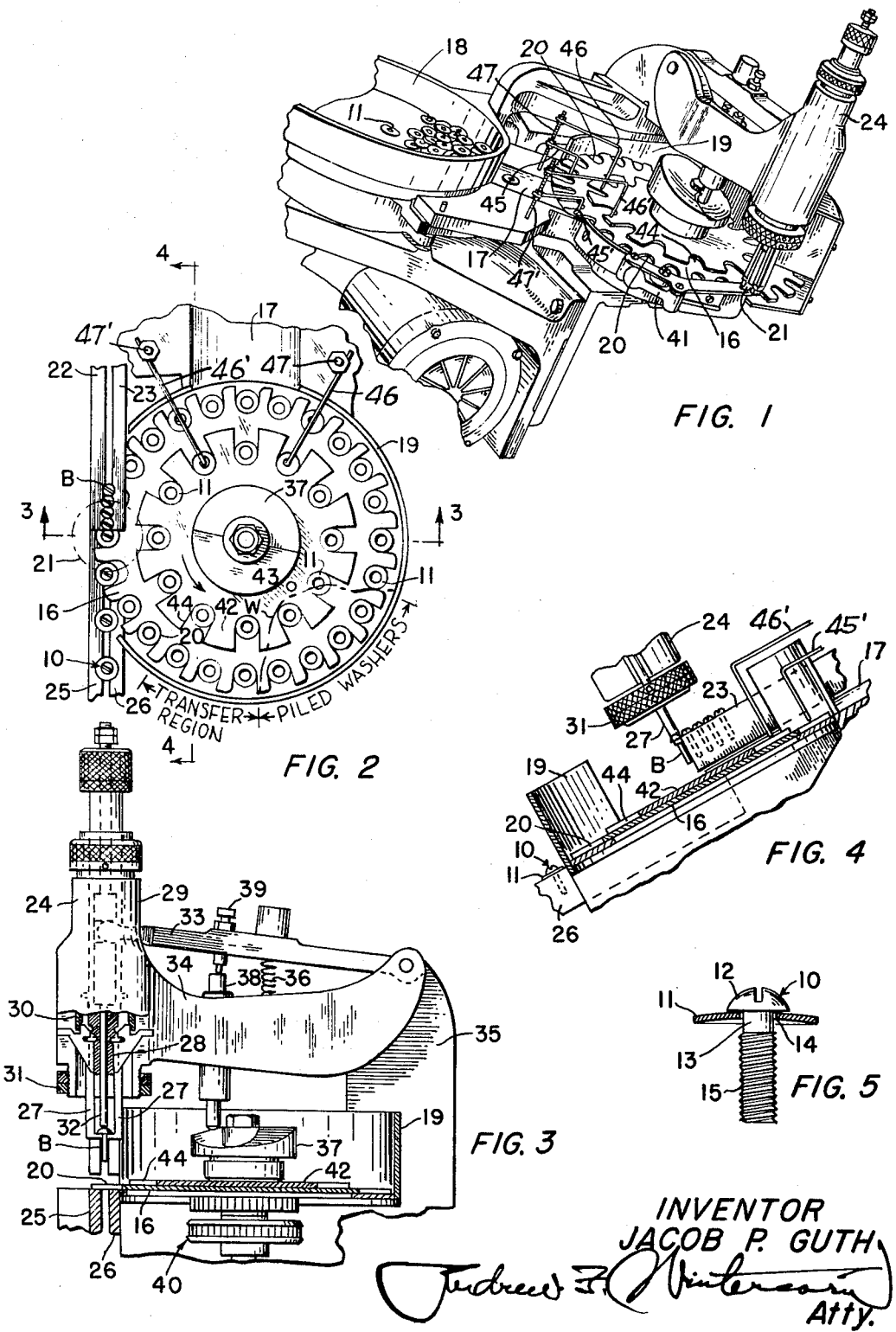
FIG. 1 is a perspective general view of an automatic assembly machine of the kind mentioned incorporating the improvements of my invention.
FIG. 2 is a plan view of the dial portion of the machine better illustrating the novel combination of washer feed dials provided in accordance with my invention.
FIG. 3 is a sectional view on the line 3—3 of FIG. 2.
FIG. 4 is another sectional view in a plane at right angles to FIG. 3, taken on the line 4—4 of FIG. 2.
FIG. 5 is a view partly in side elevation and partly in section of a completed assembly of screw and washer assembled in the present machine.

FIGS. 6 and 7 are enlarged sectional details showing how a washer, when inverted in either of the dials, as in FIG. 6, is ejected by action of the spring fingers riding on the notched peripheral portions of the dials, and how the same spring fingers ride over a properly positioned washer in FIG. 7, and FIGS. 8 and 9 show two washer feed dials in combination, the combination shown in FIG. 8 being like that shown in FIGS. 1 and 2, and the auxiliary dial shown in FIG. 9 having double the number of notches so that there is one radially aligned with each of the notches in the main dial.

Similar reference numerals are applied to corresponding parts throughout the views.

Referring first to FIG. 5, the reference numeral 10 designates the screw and washer assembly generally, the washer 11 being of the Belleville type, the high side of which should be toward the head 12 of the screw when the smooth shank 13 is entered in the center hole 14 preliminary to the threading of the shank, as indicated at 15, in a subsequent roll-threading operation, the threads forming a sufficient enlargement of the shank below the washer to prevent its slipping off. Heretofore, the Waterbury and Hartford assembling and roll-threading machines for producing the assemblies 10 were seriously limited in their output by reason of the fact that they employed only a single peripherally notched rotary dial 16 onto which washers 11, fed in the usual way down the inclined chute 17 from the inclined hopper 18 would be collected on the lower side of the inclined dial 16 within the second and lower hopper, the bottom of which is defined by the dial 16 and the side walls by the inclined annular retaining ring 19, so as to enter the notches 20 and be carried through nearly 270° to the assembly point 21 where they receive the screw blanks B fed to the machine in any suitable manner, as, for example, down an inclined chute formed by spaced guide bars 22 and 23. The dial 16 moving washers 11 in the notches 20 to the assembly station 21 positions each washer in vertical alignment with the assembly mechanism 24 so as to receive a screw blank B, and then this assembly travels downwardly along the chute composed of another pair of spaced inclined guide bars 25 and 26, the assembly proceeding thereafter to the threading station where the threads 15 are formed on the shank 13 by roll-threading.

The disclosure so far is generally along the lines of the machine shown in Irwin Patent 2,273,782. As described in that patent, the jaws 27 of the assembly mechanism 24 are fulcrumed on a hollow slide bar or sleeve 28 slidable in a tubular guide 29 which carries a sleeve 30 having bevelled inner surfaces causing a desired opening movement of the jaw members as they approach their upper limit of movement, the sleeve also carrying a collar 31 causing a desired opening movement of the jaw members again as they approach their lower limit of movement, whereby said jaws are adapted to pick off one blank B at a time from the upper guide and deposit it in the washer 11 while entering the blank in the lower guide. A slide rod 32 engages the head of the screw blank clamped in the jaws and is slidably mounted in the bar or sleeve 28 and is operated by a lever 33. As the slide rod 32 moves downwardly and engages the head of the screw blank it causes the jaw members holding the screw blank to move downwardly. The tubular guide 29 is carried by a bracket 34 adjustably secured at its outer end to a base 35. The lever 33 is moved downwardly by spring 36 secured at one end to the lever and at the other end to the bracket 34. A rotary cam 37 turning with the dial 16 moves the lever 33 upwardly and controls its downward movement. Cam 37 operates lever 33 through a sliding pin 38 mounted in the bracket 34 and engaging an adjusting screw 39 carried on the lever 33.

In operation, dial 16 is rotated counterclockwise, preferably intermittently, by any suitable mechanism indicated at 40. Washers 11 accumulate in a pile as at W in the lower right portion of the retaining ring 19, so that the dial 16 picks up washers in the notches 20 and carries them first in an upward direction out of the pile W and around toward the assembly station 21 and onto bars 25 and 26 near their upper ends to receive the screw blanks B fed from the lower end of bars 22 and 23 by jaws 27. However, if the feeler 41 that is positioned to engage the rims of the washers 11 at the assembly station 21, finds a notch 20 vacant, the feeler projects into the notch and is thereby interposed as an abutment in the path of a screw blank B so that downward movement of the jaw mechanism 27 under the action of spring 36 is prevented, and hence, there is no danger of a washerless screw blank B being fed to the guide chute 25–26.

In accordance with my invention, a smaller radius secondary or auxiliary washer feed dial 42 is superimposed upon and turns with the main dial 16 in concentric relation thereto, the two dials being pinned together, as indicated at 43 in FIG. 8, and the smaller dial having its notches 44 radially aligned with the notches 20 in the main dial, there being one notch 44 in the secondary dial for every two notches 20 in the main dial. The secondary dial may, however, be provided with the same number of notches 44, as indicated in the dial 42', shown in FIG. 9. The notches 44, in either case, pick up washers 11 from the pile W in the same way as notches 20, and, as described before, the washers are carried first in an upward direction out of the pile W and around toward the assembly station 21. With either auxiliary dial, the purpose is to increase the machine's output of assemblies 10 in a direct ratio to the extent to which this new combination of dials 16 and 42 or 42' insures the presence of a washer 11 in practically every notch 20 in the main dial 16, most all vacancies being filled by gravity feeding of washers from the notches 44 in the secondary dial to radially aligned notches 20 in the main dial in the transfer region to the left of the pile of washers W. In other words, washers in the notches 44 in the secondary dial 42 or 42' slide down substantially radially of the dials and drop into notches 20 in the main dial to fill up whatever vacancies would otherwise occur, so that there is far less likelihood of any vacancies when the notches arrive at the assembly station 21. Of course, if there is no vacancy in a notch 20 when a washer slides down from a radially aligned notch 44 in the secondary dial, this surplus washer is added to pile W. When my improvement is added to a machine, it is only when spring fingers 45 and 46 or 45' and 46' kick out inverted washers that any vacancies in notches 20 can occur at the assembly station, the washers kicked out being added to the pile W. However, with the secondary set of notches 42 from which to supply washers to the main set of notches 20 in the transfer region, the danger of vacancies occurring at the assembly station is reduced about 50% and production is increased proportionately. Approximately 35% increase in production is realized per machine, with my improvement.

As shown in FIGS. 6 and 7, and also to some extent in FIG. 1, spring fingers 45 and 46 are carried on a post 47 on one side of chute 17 and another pair of spring fingers 45' and 46' on another post 47' on the other side of the chute 17 serve by sliding contact with the top surfaces of the dials along the notched peripheries thereof to single out and eject washers 11 that happen to be entered in the notches 20 and 44 in inverted position, as shown quite clearly by the full line and dotted line positions of washer 11 in FIG. 6, that washer being inverted and therefore requiring ejection. The initial engagement of the spring fingers 45 and 46 with such an inverted washer results in it being tipped upwardly, as indicated in dotted lines in FIG. 6, so that the further contact of the finger on the washer in the turning of the disk relative to the finger and washer being held tilted by it is enough to eject it, whereas, on the other hand, whatever washers 11 are entered right side up as shown in FIG. 7 are not disturbed because spring fingers 45 and 46 and 45' and 46' ride smoothly over the tops thereof.

It is believed the foregoing description conveys a good understanding of the objects and advantages of my invention. The appended claims have been drawn to cover all legitimate modifications and adaptations.

I claim:

1. Washer feeding means comprising a hopper having an inclined bottom wall section with an annular retaining wall enclosing a rotatable circular correspondingly inclined dial receiving on its top surface a supply of washers to be fed, said dial having radially outwardly opening notches for receiving washers provided in the peripheral portion thereof, and a secondary circular inclined dial of smaller diameter superimposed upon and rotatable with the first dial in coaxial relationship thereto and having radially outwardly opening notches provided in the periphery thereof, the top surface of said secondary dial being also disposed under the same supply of washers resting on the top surface of the first dial so as to receive washers from said supply in the notches provided therein in the same way as with the first dial, said secondary dial serving to feed washers radially downwardly by gravity from notches in the lower portion of said secondary dial to unoccupied notches therebelow in the lower portion of the first dial as washers entered in notches in the secondary dial are transferred substantially radially outwardly thereof by gravity into closely adjacent notches in the first dial before these notches between which the transfer may occur come under the supply of washers.

2. Washer feeding means as set forth in claim 1, wherein the notches in the peripheral portion of the secondary dial are substantially radially aligned with notches in the peripheral portion of the first dial.

3. Washer feeding means as set forth in claim 1, wherein the notches in the perpheral portion of the secondary dial are substantially radially aligned with notches in the peripheral portion of the first dial, there being notches in the secondary dial in register with alternate notches in the first dial.

4. Washer feeding means as set forth in claim 1, wherein the notches in the peripheral portion of the secondary dial are substantially radially aligned with notches in the peripheral portion of the first dial, there being notches in the secondary dial in register with all of the notches in the first dial.

5. Washer feeding means as set forth in claim 1, wherein the washers are of the Belleville type capable of entry in the notches in inverted condition, high side down, the washer feeding means including spring fingers stationarily mounted relative to said dials to ride on the top surfaces of both dials on the notched periphery thereof, whereby to eject inverted washer from said notches.
to eject inverted washers from said notches.

References Cited

UNITED STATES PATENTS

| 2,273,782 | 2/1942 | Irwin | 221—169 |
| 2,613,374 | 10/1952 | Gora | 221—167 |
| 3,145,875 | 8/1962 | Medoff | 221—167 |

EVON C. BLUNK, *Primary Examiner.*

RICHARD E. AEGERTER, *Examiner.*